United States Patent

Schroderus et al.

[11] Patent Number: 6,032,038
[45] Date of Patent: Feb. 29, 2000

[54] METHOD AND ARRANGEMENT FOR LIMITING THE USE OF A MOBILE TELEPHONE

[75] Inventors: Jari Schroderus, Oulu; Matti Jokimies, Salo; Sami Jutila, Oulu; Veli-Matti Kulla, Kiviniemi, all of Finland

[73] Assignee: Nokia Mobile Phones Ltd., Salo, Finland

[21] Appl. No.: 08/807,994

[22] Filed: Mar. 3, 1997

[30] Foreign Application Priority Data

Mar. 13, 1996 [FI] Finland ................................. 961154

[51] Int. Cl.[7] ........................................ H04Q 7/20
[52] U.S. Cl. ................................. 455/405; 455/407
[58] Field of Search ................................ 455/405, 406, 455/407, 409, 410

[56] References Cited

U.S. PATENT DOCUMENTS

| 5,631,947 | 5/1997 | Wittstein et al. | 455/409 |
| 5,812,945 | 9/1998 | Hansen et al. | 455/407 |
| 5,826,185 | 10/1998 | Wise et al. | 455/408 |
| 5,887,266 | 3/1999 | Heinonen et al. | 455/558 |

FOREIGN PATENT DOCUMENTS

WO 92/16078  9/1992  WIPO .

*Primary Examiner*—Daniel S. Hunter
*Assistant Examiner*—Myron K. Wyche
*Attorney, Agent, or Firm*—Perman & Green, LLP

[57] ABSTRACT

A method and arrangement for limiting the use of a mobile telephone is characterized in that it involves setting a time limit (TIMER_VALUE) in said mobile telephone (20). The time limit can be set for accumulated operating time or elapsed time in general. Setting of the limit is advantageously made possible by means of a secret code (SECRET_KEY). Thereafter, the mobile telephone begins measuring time, and when the elapsed or accumulated time reaches the set limit, operation of the mobile telephone (20) is blocked. Then, only operation by which a new time limit can be set or the block can be removed is allowed. A mobile telephone manufacturer can easily realize an arrangement according to the present invention in a mobile telephone, and said arrangement can just as easily be implemented by, for example, a mobile telephone renter. The temptation to misuse and steal mobile telephones decreases when it is known that said telephones have a limited operating time, after which they will not function.

4 Claims, 2 Drawing Sheets

METHOD AND ARRANGEMENT FOR LIMITING THE USE OF A MOBILE TELEPHONE

BACKGROUND OF THE INVENTION

The present invention is related to a method and arrangement for limiting the use of a mobile telephone.

In modern mobile telephone systems, a subscriber has a SIM card (Subscriber Identification Module). Data contained in the SIM card identifies the subscriber, and in practice, the data is used to check the user rights of the subscriber each time he or she uses the services of the system. By using the SIM card, the subscriber can use any mobile telephone that operates in the system. If no arrangement existed by which misuse could be prevented, then, for example, stolen mobile telephones would be easy to use by anyone possessing a SIM card. Therefore, for example, in the GSM system, an international mobile equipment indentification code, IMEI, is stored in a permanent memory location in each mobile telephone. The intent is that operators maintain a corresponding equipment identification register, EIR, which contains a list of the equipment identification codes of stolen telephones, for example. In certain situations, the system checks the equipment identification code of the mobile telephone and compares it with the data in the equipment register. If said equipment is listed as stolen, the system should block its use. In the example GSM system, which is used quite broadly, it has not yet been possible to satisfactorily implement such a checking system. The equipment registers of the operators and the data contained therein are incomplete, and it is not possible in all networks to prevent the use of a stolen mobile telephone, even if it were noticed that it is stolen. Because the inadequacy of the system that prevents misuse is known by many people, mobile telephones are commonly stolen and misused. The thefts are especially directed towards rented telephones, which are rented under false names expressly for this reason. Because the GSM system and the amount of mobile telephones used in the system are continuously growing rapidly, it is probable that these problems will also exist in the future.

SUMMARY OF THE INVENTION

The purpose of the present invention is to provide a solution for limiting the use of mobile telephones that alleviates the problems described above and prevents the theft and unpermissible use of rented mobile telephones in particular.

The method for limiting the use of a mobile telephone according to the present invention is characterized in that, in the mobile telephone a time limit is set, elapsed time is measured, and mobile telephone operation is blocked, at least in part, in response to the elapsed time having reached the set time limit. In one embodiment, a time limit is set for accumulated operating time, which is then measured.

In a preferred embodiment of said method, the setting of the time limit is possible by entering a predefined code into the mobile telephone.

In one embodiment, the setting of the time limit is possible by means of an air interface, in which case one possible realization consists of sending a coded message including a time value setting and a predefined code to a mobile telephone, and which message the mobile telephone is capable of interpreting by means of said predefined code.

An arrangement for limiting the use of a mobile telephone according to the present invention is characterized in that it includes means for setting a time limit, means for measuring elapsed time and means for blocking mobile telephone operation, at least in part, in response to the elapsed time having reached the set time limit.

In the most advantageous embodiment, the arrangement also includes means in the mobile telephone for storing a predefined code and means for allowing the setting of a time limit in response to the input of a predefined code into the mobile telephone.

In one advantageous embodiment of the present invention, a predefined code is stored in EEPROM memory of a mobile telephone, and if a code that is input into the mobile telephone is the same as the stored code, the input and storage into EEPROM memory of a time value representing a set time limit is allowed. A control part of the mobile telephone measures elapsed time, in one embodiment accumulated operating time, for example, by decreasing the time value stored in memory to correspond to the elapsed time, and when the time value reaches zero, the control part at least partly blocks operation.

The foremost benefit of a solution according to the present invention is that a manufacturer is able to realize said solution in a mobile telephone very easily, and a telephone renter is able to implement said solution just as easily. When the user of a rented telephone is told that the telephone will quit operating after a certain time or a certain amount of operating hours has passed after the rental period has ended, and the telephone can not be made to operate if certain passwords are not known, there is no sense in stealing the device. When this new system is made well known, potential misusers will also come to know of it, and they will most likely give up thoughts of misuse. In addition to mobile telephone renters, individuals with mobile telephones or companies whose personnel have mobile telephones can use the method and arrangement according to the present invention, and make it known that the telephone is protected by an operating time limit, for example, by means of a sticker affixed to the telephone.

DESCRIPTION OF THE DRAWING

The present invention and its embodiments are decsribed in more detail in the following, with references to the enclosed drawings.

DETAILED DESCRIPTION OF THE INVENTION

Figure 1:
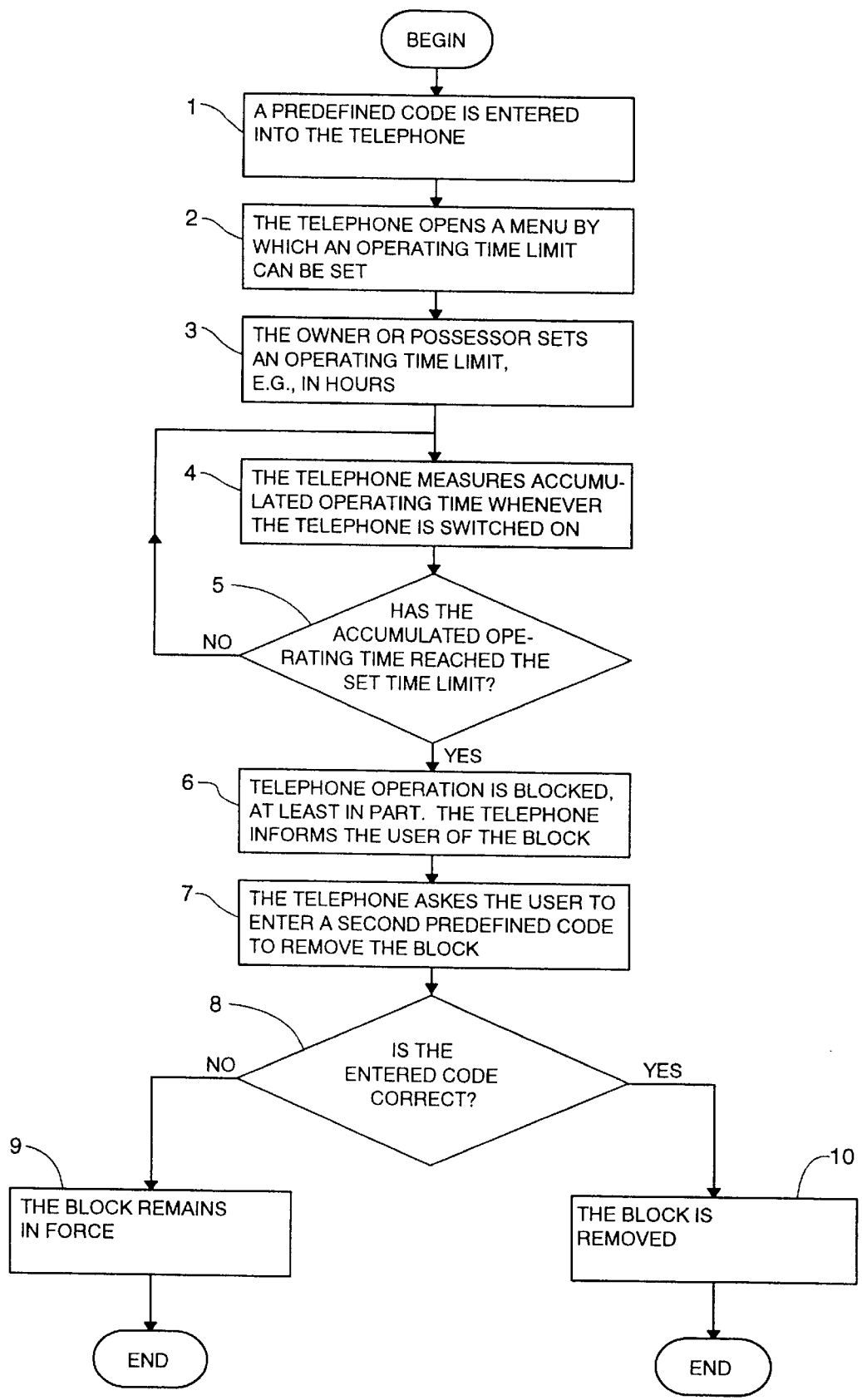
FIG. 1 is a flow chart that presents an embodiment of a method according to the present invention and FIG. 2 is a block diagram that presents an embodiment of an arrangement according to the present invention.

FIG. 1 presents an embodiment of a method according to the present invention, in which an operating time limit is set in a mobile telephone. In phase 1, an owner or possessor of the telephone enters a predefined code into the telephone. Entering the correct code opens a menu in phase 2, letting the user set an operating time limit. In phase 3 a time value is entered into the telephone, which is stored in the telephone as a set time limit. The limit can be suitably set as operating hours, for example. Then, in phase 4, the telephone measures accumulated operating time whenever the telephone is switched on. It is advantageous to arrange the operating time measurement so that the operating time accumulates whenever the telephone is switched on, not only when services are used, but also in the ready state. In phase 5 the accumulated operating time is checked against the set time to determine whether or not the set limit has been reached. If it hasn't, the telephone continues measuring accumulated operating time. If the operating time has expired, telephone operation is blocked, at least in part, and the user is informed of this in phase 6. Naturally, at least such a part of operation is blocked that makes it possible to use services offered in the mobile telephone system. In phase 7 the user is asked for a security code. If a security code entered in phase 8 is incorrect or no code is entered, operation is still blocked in phase 9. If the entered code is correct, operation is allowed in phase 10, and the user can set a new operating time limit, for example.

The method according to the present invention can also be realized by setting a limit for elapsed time instead of operating time, and measuring elapsed time. This solution is suitable, for example, in mobile telephones that contain a clock function. In an implementation corresponding to the embodiment presented in FIG. 1, a menu is opened in phase 2 for setting a time limit defined as elapsed time or a specific moment in time, and said time limit is set in phase 3 by entering a suitable time value. Elapsed time is measured in phase 4 and in phase 5 the elapsed time is checked against the set time to determine whether or not the set limit has been reached.

Other possibilities also exist for setting a time limit. One possibility is that a telephone renter has a device that can be connected to a connector of a mobile telephones, and which device alone makes it possible to set and also remove an operating block from telephones in which the time has expired. If person skilled in the art can also easily visualize other alternative implementations in which a time limit can be set in such a way that a user cannot change or remove said limit and thus prevent the blocking of telephone operation once the time limit has been reached.

It is not mandatory for a telephone to contain a second security code for removing an operating block resulting from the operating time having expired. On the other hand, the second security code can be the same as the code by which the time limit can be set, whereupon said code is only known by a telephone renter or the owner of a telephone, for example.

Several alternatives exist in a mobile telephone for blocking operation, at least in part. This can be realized, for example, by blocking an essential part of the operation of the user interface. For example, the functions that follow a press of the SEND or END buttons can be blocked, whereupon it is not possible to make a connection. User interface operation can be allowed that permits the entry of a security code that removes the operating block, if such a code is implemented in the mobile telephone. Querying of the user's PIN code can be allowed, as well as registration of the mobile telephone into the network, whereupon it will be in a ready state, but it is not possible to form a voice or data connection. Querying of an international mobile subscriber identification code (IMSI) and an international mobile equipment identification code (IMEI) can also be allowed, whereupon the time limit of a stolen telephone can be set to zero or a new time limit can be set through the network. An implementation is presented in later that makes it possible to perform a secured update of the time limit via an air interface.

Another possibility for blocking operation is to cause the software that controls signalling, i.e., the cellular software, to enter a non-operating state, whereupon connections cannot be made. In such a case, if so desired, programming can be realized so that emergency calls are possible. A third possibility is to block the operation of the radio frequency part of the telephone. In these two alternatives it is not possible to set the time limit or remove a block through an air interface.

Updating of the time limit through an air interface can be realized by using a short message service (SMS), for example. One possible realization is as follows. A mobile telephone manufacturer compiles software for creating short message user data. The data entered into the software are: an international mobile equipment identification code (IMEI), a predefined security code, a time period (a new time limit) and a number that indicates how many times the time limit has been updated via the SMS. From this data, the software creates a coded message that is sent to the mobile telephone in question via SMS. A mobile telephone that contains corresponding data is able to interpret the message, and the correctness of the data in the message is checked at the same time. If the data is correct, a new time limit is set into the EEPROM memory and the SMS update counter is increased by one. Then the message is destroyed. If, for example, the number in the message indicating the number of SMS updates is incorrect, the SMS update operation is blocked until the time limit is manually reset by using a security code. Even though someone has knowledge of this procedure, it cannot be used unless the security code is known. If someone is able to intercept the message, it cannot be reused, because the number in the mobile telephone indicating the number of SMS updates has been increased, meaning the number in the message is incorrect.

It is possible to use the method according to the present invention for other purposes, also. One such purpose could be that the user is forced to use this method to update the software in his or her mobile telephone after a certain time period or period of operation, for example. Such a procedure could come into question, for example, in a company that designs mobile telephones, in order to assure that the software is up to date in telephones used in designing and testing.

Figure 2:
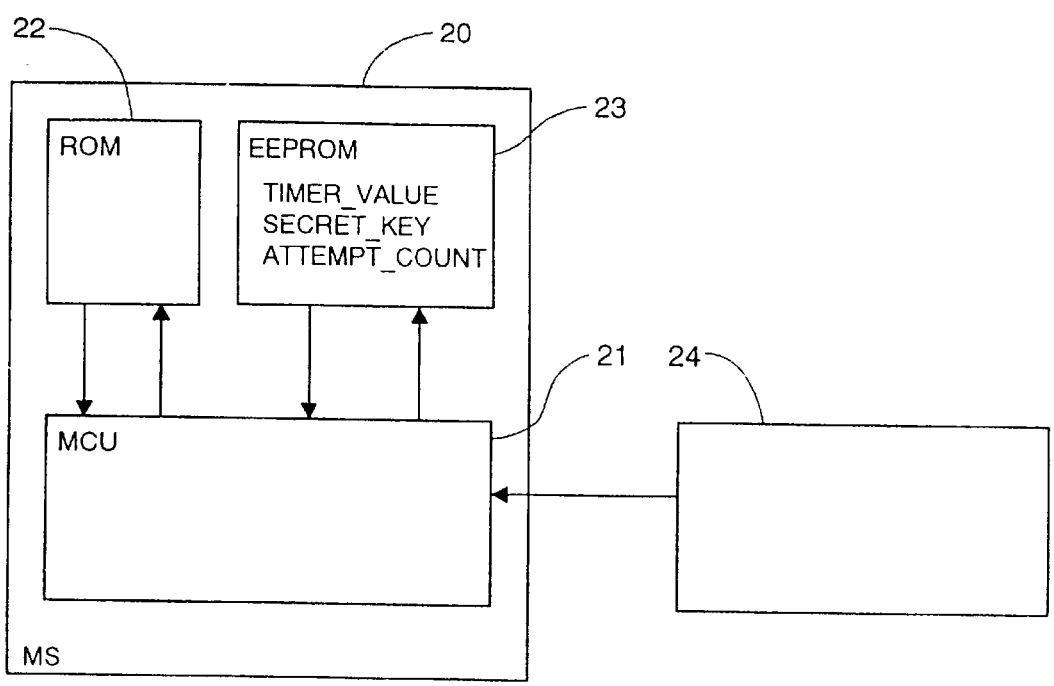

In FIG. 2, only parts of a mobile telephone 20 are shown that are most essential to the realization and explanation of an arrangement according to the present invention. Reference number 21 indicates a central control unit MCU, number 22, a ROM memory that is primarily for software storage, and number 23, an erasable non-volatile memory that is usually an electrically erasable EEPROM memory. External to the mobile telephone 20 is shown a device 24 that, in an advantageous embodiment, is a keypad belonging to the mobile telephone, but which may be a device that can be connected to a connector of the mobile telephone, can communicate with the mobile telephone device, and can be used to enter information into the mobile telephone. According to the method described in FIG. 1, an arrangement according to the present invention can be such that a predefined code or password SECRET_KEY is. first entered into the mobile telephone by means of a keypad or some other device. A value for said code is stored in EEPROM memory, and the central control unit 21 compares the value to the received code and, for example, opens a menu in a display by which the operating time limit can be set, if the received code is correct. The set operating time limit is also stored in EEPROM memory, for example, as the value of a variable TIMER_VALUE. The mobile telephone 20 is equipped with software that directs the central control unit 21 to periodically read the value of said variable from the memory on the one hand, and periodically update said value every few minutes on the other hand, for example, by decreasing it by an amount corresponding to elapsed time. When the value of the variable TIMER_VALUE has reached zero, the set operating time has expired, and the central control unit 21 blocks operation of the mobile telephone 20, at least in part. EEPROM memory 23 may also contain a code by which the operating time monitoring can be disabled or operation of the mobile telephone can be restored after it has been blocked. In such a case, a menu opened by the code also can be used. A counter ATTEMPT_COUNT can also function in the memory 23, which counts the number of attempts at entering a code and causes the central control unit 21 to close the telephone 20 completely when the number of incorrect attempts exceeds a predefined limit. Furthermore, the EEPROM memory may contain a counter similar to the embodiment described above that counts the number of updates performed via an air interface. The software needed to realize an arrangement according to the present invention can be realized, for example, in conjunction with user interface software or some other suitable block of software, depending on the manner in which blocking of operation is realized.

It is clear to a person skilled in the art that the realization described herein of an arrangement according to the present invention is just one advantageous alternative. The same operation can be realized, for example, by defining two variables in the software, whose values are updated in EEPROM memory 23, with the set time limit being stored as one value, and the other value functioning as a counter that counts elapsed time or accumulated operating time. The value of the counter variable can be compared to the value of the limit variable, and operation is blocked when the value of the limit variable is reached. A person skilled in the art understands that measurement of time or counting and comparing to a set limit value can be arranged in a mobile telephone in many other ways, also. Likewise, the non-volatile memory, into which the values and codes are stored, can be something other than EEPROM memory.

The present invention can vary within the scope of the enclosed claims.

We claim:

1. In a mobile telephone handset operatively connected to a mobile telephone system, said handset constructed to be rented by the user and having a keypad for entering information; a memory for storing information and rental operation software; and a control unit for operating the telephone in response to said software; a method for limiting said period of rental use of the mobile telephone handset comprising the steps of:

setting a time limit for said period of rental use of said mobile telephone in said memory;

measuring the elapsed time of rental use of said mobile telephone;

comparing said measured elapsed rental time with said set time limit;

blocking the operation of said mobile telephone, at least in part, in response to the elapsed rental time having reached the set time limit;

setting a predetermined security code in said memory;

resetting said period of rental use by entering a security code through the use of said keypad; and allowing the resetting of the period of rental use to an extended period when said entered security code matches said predetermined security code.

2. In a mobile telephone handset operatively connected to a mobile telephone system, said mobile phone constructed to be rented by the user and having a keypad for entering information; a memory for storing information and rental operation software; and a control unit for operating the telephone in response to said software; a method for limiting said period of rental use of the mobile telephone handset as described in claim 1 wherein the resetting of the time limit is performed via an aerial interface using a short message service of the mobile telephone system.

3. In a mobile telephone handset, an arrangement for limiting the rental use of said mobile telephone handset, said handset comprising:

a keypad for entering information, including a predetermined period of rental use;

a memory for storing information entered by said keypad and rental operation software; said information including said period of rental use a control unit for operating the telephone in response to said software; wherein said control unit measures elapsed time of rental use, compares said elapsed time of use and said predetermined rental period and blocks operation of the hadnset when said elapsed time is equal to said predetermined rental period; and further wherein a predetermined security code is stored in the memory for comparison in said control unit with a security code entered by the user by means of the keypad, said control unit allowing the resetting of the period of rental use when said entered security code matches said predetermined security code.

4. In a mobile telephone handset, an arrangement for limiting the use of said mobile telephone handset, as described in claim 3, wherein the time limit may be reset via an aerial interface using a short message service of a mobile telephone system.

\* \* \* \* \*